US011888381B2

(12) United States Patent
Folkesson

(10) Patent No.: US 11,888,381 B2
(45) Date of Patent: Jan. 30, 2024

(54) ELECTRIC MACHINE FOR A VEHICLE

(71) Applicant: VOLVO TRUCK CORPORATION, Gothenburg (SE)

(72) Inventor: Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 80 days.

(21) Appl. No.: 17/643,059

(22) Filed: Dec. 7, 2021

(65) Prior Publication Data

US 2022/0190678 A1 Jun. 16, 2022

(30) Foreign Application Priority Data

Dec. 11, 2020 (EP) .................................... 20213335

(51) Int. Cl.
*H02K 7/10* (2006.01)
*B60T 1/12* (2006.01)
(Continued)

(52) U.S. Cl.
CPC .................. *H02K 7/10* (2013.01); *B60T 1/12* (2013.01); *F16D 57/04* (2013.01); *F16D 65/78* (2013.01)

(58) Field of Classification Search
CPC ............ H02K 1/276; H02K 5/00; H02K 5/12; H02K 7/00; H02K 7/006; H02K 7/10; H02K 7/102; H02K 7/1008; H02K 17/00; H02K 17/32; F16D 57/00; F16D 57/005; F16D 57/02–06; F16D 65/00; F16D 65/02; F16D 65/78; F16D 65/127; B60T 1/00; B60T 1/08; B60T 1/087; B60T 1/09; B60T 1/093; B60T 1/12; B60T 13/00;
(Continued)

(56) References Cited

U.S. PATENT DOCUMENTS 3,958,671 A * 5/1976 Muller .................... B60T 1/087 188/274
4,331,223 A * 5/1982 Charlat .................. F16D 57/06 188/294
(Continued)

FOREIGN PATENT DOCUMENTS

DE 102018103592 A1 9/2018
DE 102019202849 A1 9/2020
(Continued)

OTHER PUBLICATIONS

European Search Report dated Jun. 10, 2021 in corresponding European Patent Application No. 20213335.1, 5 pages.

*Primary Examiner* — Tran N Nguyen
(74) *Attorney, Agent, or Firm* — Venable LLP; Jeffri A. Kaminski

(57) ABSTRACT

An electric machine comprising a rotor, a stator, and a fluid-based brake arrangement for said rotor, said fluid-based brake arrangement having a fluid circuit for transporting a brake fluid, said fluid circuit comprising a fluid channel arrangement having at least one radial fluid channel segment extending radially through a part of said rotor so as to allow for directing brake fluid from an inner radial rotor side to an outer radial rotor side, whereby, during rotation of said rotor about an axial centre axis, acceleration of brake fluid in said at least one radial fluid channel segment causes a reaction force exerting a braking torque on the rotor.

16 Claims, 12 Drawing Sheets

(51) Int. Cl.
*F16D 57/04* (2006.01)
*F16D 65/78* (2006.01)

(58) Field of Classification Search
CPC .......... B60T 13/74; B60T 13/748; B60T 5/00; B60T 10/00; B60T 10/02; B60T 10/08
See application file for complete search history.

(56) References Cited

U.S. PATENT DOCUMENTS

| | | | |
|---|---|---|---|
| 5,779,008 | A | 7/1998 | Vogelsang et al. |
| 2008/0035440 | A1 | 2/2008 | Hoeller |

FOREIGN PATENT DOCUMENTS

| | | | |
|---|---|---|---|
| EP | 0641499 | B1 | 6/1997 |
| SE | 1750259 | A1 | 9/2018 |

* cited by examiner

ELECTRIC MACHINE FOR A VEHICLE

TECHNICAL FIELD

The present invention relates to an electric machine, in particular an electric machine for a vehicle. The invention also relates to a vehicle comprising such an electric machine. The invention further relates to a method for controlling such an electric machine by a control unit.

The invention is applicable on vehicles, in particularly heavy-duty vehicles, such as e.g. trucks. However, although the invention mainly is described with respect to an electrical truck, the invention is not restricted to this particular vehicle, but may also be used in other hybrid or electric vehicles such as electrical busses, electrical construction equipment, and electrical cars. The invention may also be applied in any other type of vehicle comprising an electric machine, such as electrical powered construction equipment, electrical marine vessels, electrical working machines e.g. wheel loaders, articulated haulers, dump trucks, excavators and backhoe loaders etc.

BACKGROUND

For many years, the demands on electric machines for vehicles have been steadily increasing and electric machines are continuously developed to meet the various demands from the automotive industry in relation to hybrid- and electric vehicles. Such electric machines are employed as motors, as generators and as motor-generators.

Moreover, such electric machines typically comprise a fixed part, the stator, and a rotational part, the rotor. In some types of electric machines, the rotor may be coaxially arranged inside the stator and further adapted to generate a magnetic field, which allows for rotating the rotor. In some types of electric machines, the rotor may have a body composed of a pack of sheets and placed on a rotation shaft.

In the field of electric machines installed for providing traction power in various vehicles, in particular in heavy-duty trucks, there is often a need for an auxiliary braking device, i.e. a retarder. The auxiliary braking device may act as a safety feature for heavy-duty trucks with the need to descend long slopes at relatively high speeds.

In order to meet the described demands, various types of braking concepts have been proposed and developed throughout the years.

WO 93/24985 A1 discloses one example of a rotational electric motor with a retarder. The electric motor includes a stationary internal stator and a bell-shaped external rotor. On the outside of the rotor there is disposed a number of vanes which in conjunction with adjustable vanes located on the inside of the housing allows for producing a braking effect that varies depending on the position of the adjustable vanes. In this manner, there is provided a hydrodynamic brake used as a retarded.

Despite the activity in the field, there remains a need for further improving braking of an electric machine, such as an electric machine for a vehicle.

SUMMARY

In view of the foregoing, it is an object of the present invention to provide an electric machine with an improved braking efficiency in a simple, yet reliable manner.

The objective is achieved by the invention as defined by the independent claims. The dependent claims are directed to advantageous embodiments of the invention.

According to at least a first aspect of the present invention, there is provided an electric machine. The electric machine comprises a rotor, a stator, and a fluid-based brake arrangement for the rotor. The fluid-based brake arrangement has a fluid circuit for transporting a brake fluid. The fluid circuit comprises a fluid channel arrangement having at least one radial fluid channel segment extending radially through a part of the rotor so as to allow for directing brake fluid from an inner radial rotor side to an outer radial rotor side, whereby, during rotation of the rotor about an axial centre axis, acceleration of brake fluid in the at least one radial fluid channel segment causes a reaction force exerting a braking torque on the rotor.

In other words, due to the configuration of the fluid channel arrangement in the rotor, the fluid is allowed to accelerate in the radial fluid channel segment during rotation of the rotor. Typically, the fluid may accelerate to the peripheral speed of the rotor, or possibly higher, depending on type of radial fluid channel segment. In this manner, it becomes possible to create a relatively high braking torque on the rotor. As may be realized from the above, the radial fluid channel segment is integrated in the rotor of the electric machine. Thus, a simple but yet effective means for braking the rotor is provided.

Further, the provision of transporting the brake fluid radially through a part of the rotor in the radial fluid channel segment provides for a reliable behaviour of the rotor brake and may render the brake arrangement particularly suitable for use in a vehicle having an electric machine. To this end, there is provided a brake arrangement for a rotor that has no or only very few loose or moveable parts inside the electric machine.

In addition, the fluid-based brake arrangement allows for an improved control of the braking function, while at least partly contribute to an improved control of the brake fluid flow into the rotor.

Another advantage of the integration of the fluid-based brake arrangement in the electric machine is that the braking function of the electric machine may generally occupy less space and/or allow for higher recuperation power, at least compared to a combined arrangement with an electric motor and an auxiliary braking device. By way of example, a separate conventional retarder may drive costs and also occupy space around the system, not only due to the retarder itself, but also due to the adaptation of the drivetrain needed to accommodate the connection of the retarder.

According to at least one example embodiment, the radial fluid channel segment comprises a plurality of channel portions, each one of the channel portions extending from the inner radial side to the outer radial side of the rotor. The outer radial side generally refers to an outer circumferential periphery of the rotor. The inner radial side generally refers to an inner circumferential periphery of the rotor. Typically, the radial channel portions of the radial fluid channel segment may be evenly distributed in the axial direction of the rotor.

As described herein, the radial fluid channel segment may also be provided in the form of a plurality of axial through holes, each one of the axial through holes extending a substantial part in the radial direction.

It should be readily appreciated that the radial fluid channel segment is arranged to extend completely through the rotor in the radial direction. That is, the radial fluid channel segment is radially arranged at least through a cross-sectional part of the rotor. Further, it should be readily appreciated that the radial fluid channel segment may generally be arranged through a part of the rotor at a location where the extension of the radial fluid channel segment in the axial direction is delimited by the rotor body material. According to at least one example embodiment, the radial fluid channel segment has a main extension in a radial fluid flow direction, and an extension in the axial direction being perpendicular to the main extension.

Moreover, the radial fluid channel segment may be a tubular channel segment.

The invention may be applicable to a rotor of any type of electrical machine. In particular, the invention may be applicable to rotors manufactured by laminated steel sheets axially stacked along the rotation axis of the rotor. According to at least one example embodiment, the electric machine is a rotating electric machine, i.e. any electrical machine with a rotor. By way of example, the electric machine is any one of a permanent magnet synchronous machine, a brushless DC machine, an asynchronous machine, an electrically magnetized synchronous machine, a synchronous reluctance machine or a switched reluctance machine.

By way of example, the rotor of the electric machine is an embedded permanent magnet (PM) rotor. However, the invention may be applicable to any electric machine topology (e.g. inner and external rotor machines, radial flux machines with internal or external rotors), and/or to any kind of embedded rotor topology (e.g. with single embedded permanent magnets or multiple layered embedded permanent magnets, aligned or V-shaped embedded permanent magnet arrangements). The rotor can be manufactured by laminated iron sheets axially stacked along a rotation axis of the rotor (typical for a radial flux machine).

According to at least one example embodiment, the electric machine is an internal rotor arrangement, in which the stator is an outer stator and the rotor is an inner rotor coaxially arranged inside the outer stator. This type of internal rotor arrangement is commonly known in the art.

According to at least one example embodiment, the rotor and stator are spaced apart relative each other in the radial direction so as to define a radial space therebetween. Further, the at least one radial fluid channel segment has a radial outlet aligned with the radial space, whereby, during rotation of the rotor, the brake fluid is allowed to flow in the radial space.

According to at least one example embodiment, the fluid channel arrangement has an entrance for the brake fluid at an axial centre of the rotor. Generally, the entrance is in fluid connection with the at least one radial fluid channel segment. According to at least one example embodiment, the fluid channel arrangement has an outlet arranged proximity to an axial rotor end at the outer radial rotor side. Further, the outlet may be in fluid connection with the at least one radial fluid channel segment.

With reference to the above-mentioned embodiment comprising a plurality of channel portions, each channel portion may generally comprise a corresponding inlet and a corresponding outlet, respectively. In this example embodiment, the inlets are generally in fluid communication with the entrance, while the outlets are in fluid communication with the outlet of the fluid channel arrangement, thereby defining a common outlet.

According to at least one example embodiment, the rotor comprises an inner hollow rotor shaft. The inner hollow rotor shaft defines an axial fluid passage for the brake fluid. Further, the axial fluid passage is arranged in fluid communication with the at least one radial fluid channel segment.

According to at least one example embodiment, the electric machine comprises a cooling circuit for the brake fluid, the cooling circuit being arranged in fluid communication with the fluid circuit. The cooling circuit may be arranged in any sequence relative to the radial fluid channel segment, e.g. downstream the radial fluid channel segment. The cooling circuit may include a heat exchanger for reducing the temperature of the brake fluid after its passage through the rotor.

Typically, although strictly not required, the electric machine may comprise a reservoir for the brake fluid. The reservoir is arranged in fluid communication with the fluid circuit. By way of example, the reservoir may be arranged in any sequence relative to the cooling circuit, e.g. downstream of the cooling circuit.

According to at least one example embodiment, the rotor comprises a lamellar rotor body having a series of radial extending sheets arranged along the axial direction. In this manner, there is provided rotor with a so-called lamellar pack design. Moreover, each one of the radial extending sheets comprises an axial through hole extending a substantial part in the radial direction. Hereby, the extension of the radial fluid channel segment in the radial and axial direction of the rotor is defined by the series of axial through holes of the radial extending sheets. As such, the plurality of axial thorough holes forms the at least one radial fluid channel segment.

The sheets may also be considered layers or discs, and are typically arranged about the hollow rotor shaft.

According to at least one example embodiment, the axial through holes of consecutive radial extending sheets are arranged with a successive angle increment relative an axial centre axis so as to define a continuous part of the radial fluid channel segment in the radial direction and axial direction. In this manner, it becomes possible to use one common hole pattern for all the discs.

The shape of the radial fluid channel segment may vary for different types of rotors. By way of example, the radial fluid channel segment is an interior radial fluid channel segment. That is, the radial fluid channel segment is at least partly embedded in the rotor, while extending from the inner radial side to the outer radial side of the rotor. Typically, the radial fluid channel segment is configured to allow the passage of brake fluid. To provide a powerful braking function, the radial fluid channel segment may generally be designed so that a large amount of kinetic energy is transferred to the brake fluid, such as the oil.

By way of example, the radial fluid channel segment is an essentially straight radial fluid channel segment. Straight channels may be a beneficial option for manufacturing (e.g. drilling, if the rotor would be solid rather than made of stacked discs). Alternatively, the radial fluid channel segment may be a curved radial fluid channel segment. Moreover, the curved radial fluid channel may either be a forward-curved radial fluid channel or a backward-curved radial fluid channel, given the direction of rotation of the rotor. Forward-curved channels may create higher acceleration of the fluid, presumably giving higher brake torque. Backwards-curved channels may create higher flow, presumably facilitating the cooling. It may also be possible that the fluid channel arrangement comprises a combination of straight and curved radial fluid channel segments. In addition, or alternatively, the radial fluid channel segment may comprise a number of branched radial fluid sub-channels merging to a radial fluid channel segment.

According to at least one example embodiment, the radial extension of each one of the axial through holes is shorter than a total radial extension of the radial fluid channel segment. In this manner, it becomes possible to create a channel from the inner diameter of the discs to the outer diameter, without cutting any individual disc from inner to outer diameter. This is mainly beneficial for the structural integrity of the rotor. In this context, the total radial extension of the radial fluid channel segment may generally be defined as the radial extension between the inner radial side and the outer radial side.

According to at least one example embodiment, the electric machine comprises a control unit for controlling the flow of brake fluid in the fluid channel arrangement in response to a requested brake power. Typically, the control unit may also be operable to control that no brake fluid is allowed to flow in the radial fluid channel segment of the rotor during normal driving of the vehicle.

The control unit may include a microprocessor, microcontroller, programmable digital signal processor or another programmable device. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transitory memory for storing computer program code and data upon. Thus, the control unit may be embodied by many different constructions. While the example embodiments of the electric machine described above can include a control unit being an integral part thereof, it is also possible that the control unit may be a separate part of the vehicle, and/or arranged remote from the electric machine and in communication with the electric machine.

By way of example, the control unit may cooperate with a control valve disposed in the fluid circuit so as to regulate the flow of brake fluid in the fluid channel arrangement. In one example embodiment, the control valve is disposed immediately upstream of the radial fluid channel segment in fluid circuit, so as to regulate the flow of brake fluid in the fluid channel arrangement. However, in other examples, the control valve may be disposed at other locations in the fluid circuit.

According to at least one example embodiment, the electric machine comprises the brake fluid, the brake fluid being provided in the form of a liquid, such as oil or water. It may also be readily appreciated that the fluid in may be provided in a gaseous form, such as compressed air.

Typically, the electric machine may be used as a power source for driving a hybrid vehicle or an electric vehicle when an electric propulsion system is in a traction mode. The electric machine may however also be used for other purposes, e.g. to power different rotational equipment such as hydraulic pumps on construction equipment vehicles. The electric machine may generally be an integral part of the electric propulsion system of the vehicle. Generally, the term "electric propulsion system", as used herein, typically refers to vehicle electrical components for providing energy (such as traction energy) and for storing energy (delivering and receiving energy). In other words, an electric propulsion system refers to a system configured to provide propulsion to a vehicle by converting electrical energy to mechanical energy. The electrical energy is generally provided by means of an onboard energy storage system.

Typically, the energy storage system is a part of the electric propulsion system. Thus, in at least one example embodiment, the electric propulsion system also comprises the energy storage system. The energy storage system is typically a DC electrical power source. The DC electrical power source is typically provided in the form of a battery pack assembly, a fuel cells pack etc.

According to at least a second aspect of the invention, there is provided a vehicle comprising an electric machine according to the first aspect of the invention. Effects and features of the second aspect of the invention are largely analogous to those described above in connection with the first aspect of the invention. Embodiments mentioned in relation to the first aspect of the invention are largely compatible with the second aspect of the invention.

The vehicle may be an electrical, hybrid, or plug-in hybrid vehicle. Thus, the vehicle may be a fully electrical vehicle or a partly (i.e. a hybrid) electrical vehicle. The vehicle may generally also comprise an energy storage system to provide power to the electric machine for providing propulsion for the vehicle.

According to a third aspect of the present invention, there is provided a method for braking a rotor of an electric machine, comprising receiving a request for braking the rotor of the electric machine in response to a requested brake power; and controlling the flow of brake fluid in a fluid-based brake arrangement having a fluid circuit for transporting the brake fluid, so as to permit transportation of brake fluid through at least one radial fluid channel segment extending radially through a part of said rotor; whereby acceleration of the brake fluid in the at least one radial fluid channel segment causes a reaction force exerting a braking torque on the rotor.

Effects and features of the third aspect of the invention are largely analogous to those described above in connection with the first aspect and the second aspect.

According to a fourth aspect of the present invention, there is provided a computer program comprising program code means for performing the steps of any one of the embodiments of the third aspect when the program is run on a computer.

According to a fifth aspect of the present invention, there is provided a computer readable medium carrying a computer program comprising program means for performing the steps of any one of the embodiments of the third aspect when the program is run on a computer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

Figure 1:
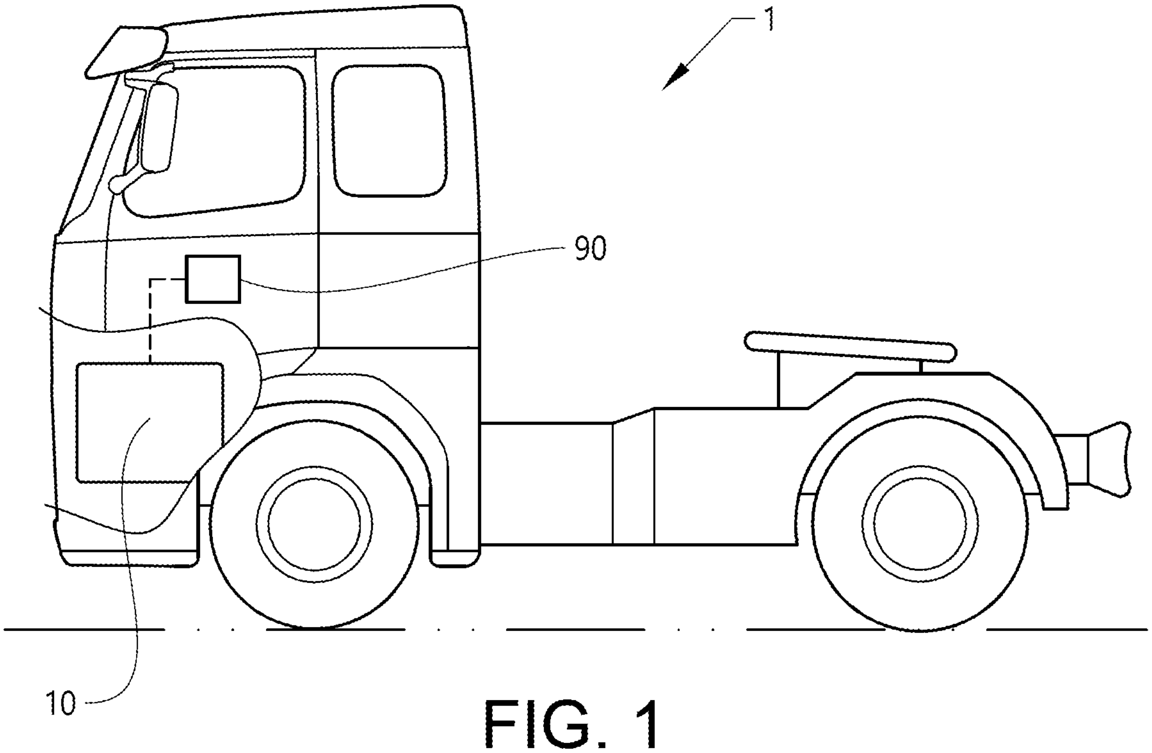
FIG. 1 is a side view of a vehicle in the form an electric truck comprising an electric machine according to an example embodiment of the present invention.

With reference to the appended drawings, below follows a more detailed description of embodiments of the invention cited as examples.

DETAILED DESCRIPTION

The aspects of the present disclosure will now be described more fully with reference to the accompanying drawings, on which certain embodiments of the invention are shown. These aspects may however be embodied in many different forms and should not be construed as limiting; rather, these embodiments are provided by way of example so that this disclosure will be thorough and complete, and to fully convey the scope of the invention to those skilled in the art. Like reference character refer to like elements throughout the description.

With particular reference to FIG. 1, there is provided a vehicle 1 comprising an electric machine 10 according to the present invention. The vehicle 1 depicted in FIG. 1 is a truck for which the electric machine 10, which will be described in detail below, is particularly suitable for. However, the electric machine may as well be implemented in other types of vehicles, such as in busses, light-weight trucks, passenger cars, marine applications etc. The electric machine is here a part of an electric propulsion system (although not illustrated) for providing propulsion to the electric truck. Besides providing propulsion to the vehicle, the electric propulsion system or parts of system may manage other electronic functions of the vehicle. The electric propulsion system may also comprise an energy storage system (although not shown). By way of example, the energy storage system is a DC energy storage system such as a battery system comprising a number of batteries. The batteries may e.g. include one or more lithium-ion batteries.

As mentioned above, the electric machine 10 is generally operated so as to provide propulsion to the vehicle. More specifically, the electric machine is configured for driving one or more ground engaging members, such as a pair of wheels of the vehicle.

By way of example, the electric machine is here a so-called induction motor, i.e. an asynchronous motor. However, the electric machine may likewise be a permanent magnet synchronous machine.

Figure 2:
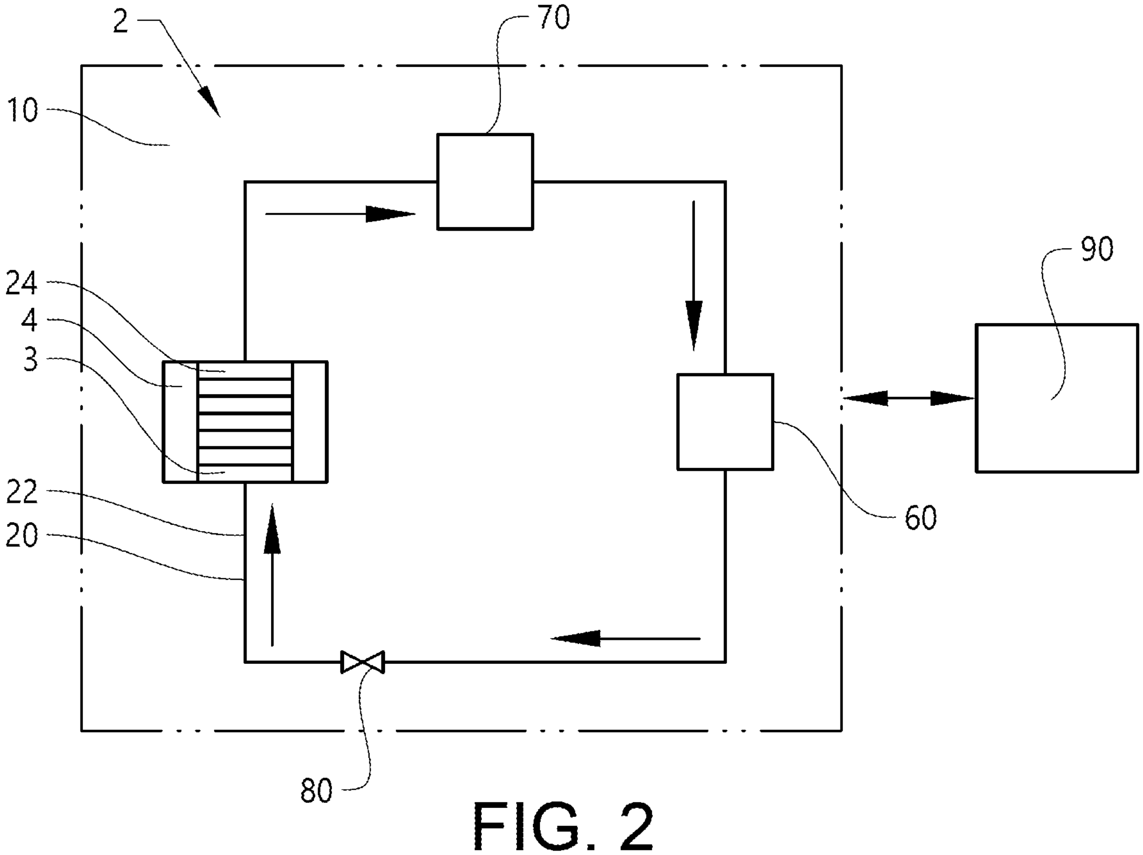
FIG. 2 schematically illustrates parts of the electric machine in FIG. 1 according to an example embodiment of the invention.
Figure 3A:
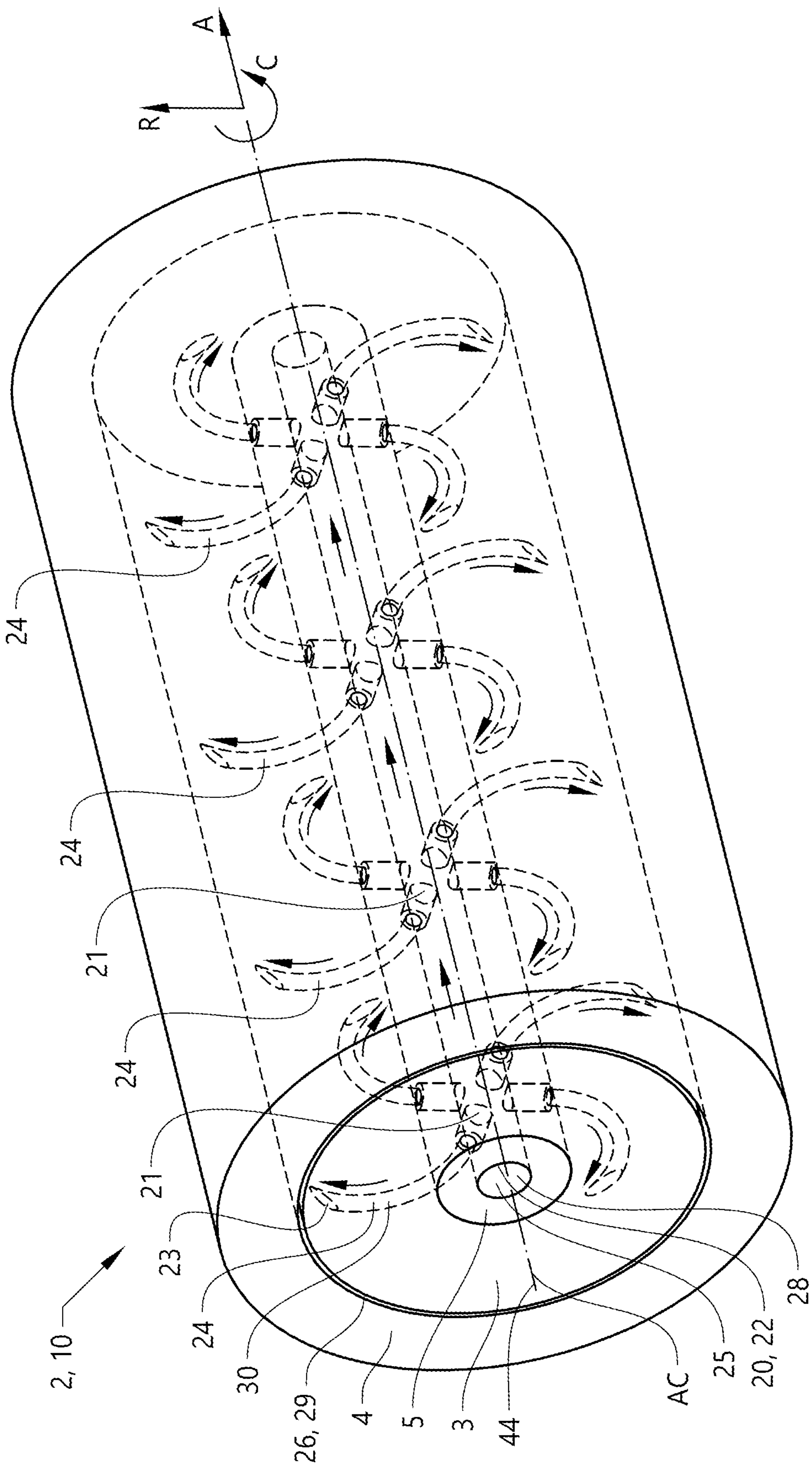
FIGS. 3*a*-3*c* schematically illustrate an example embodiment of a fluid-based brake arrangement for a rotor of the electric machine in FIG. 2 according to the invention.
Figure 3B:
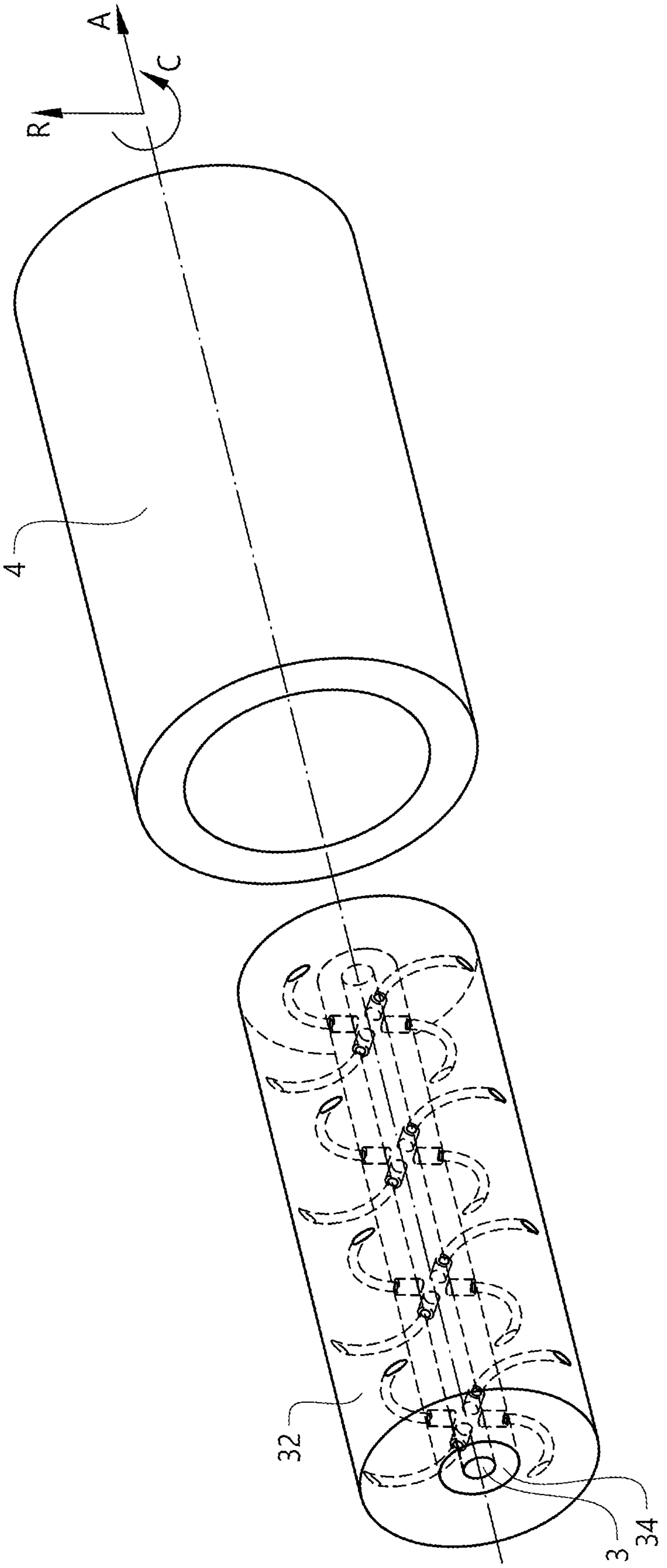
Figure 3C:
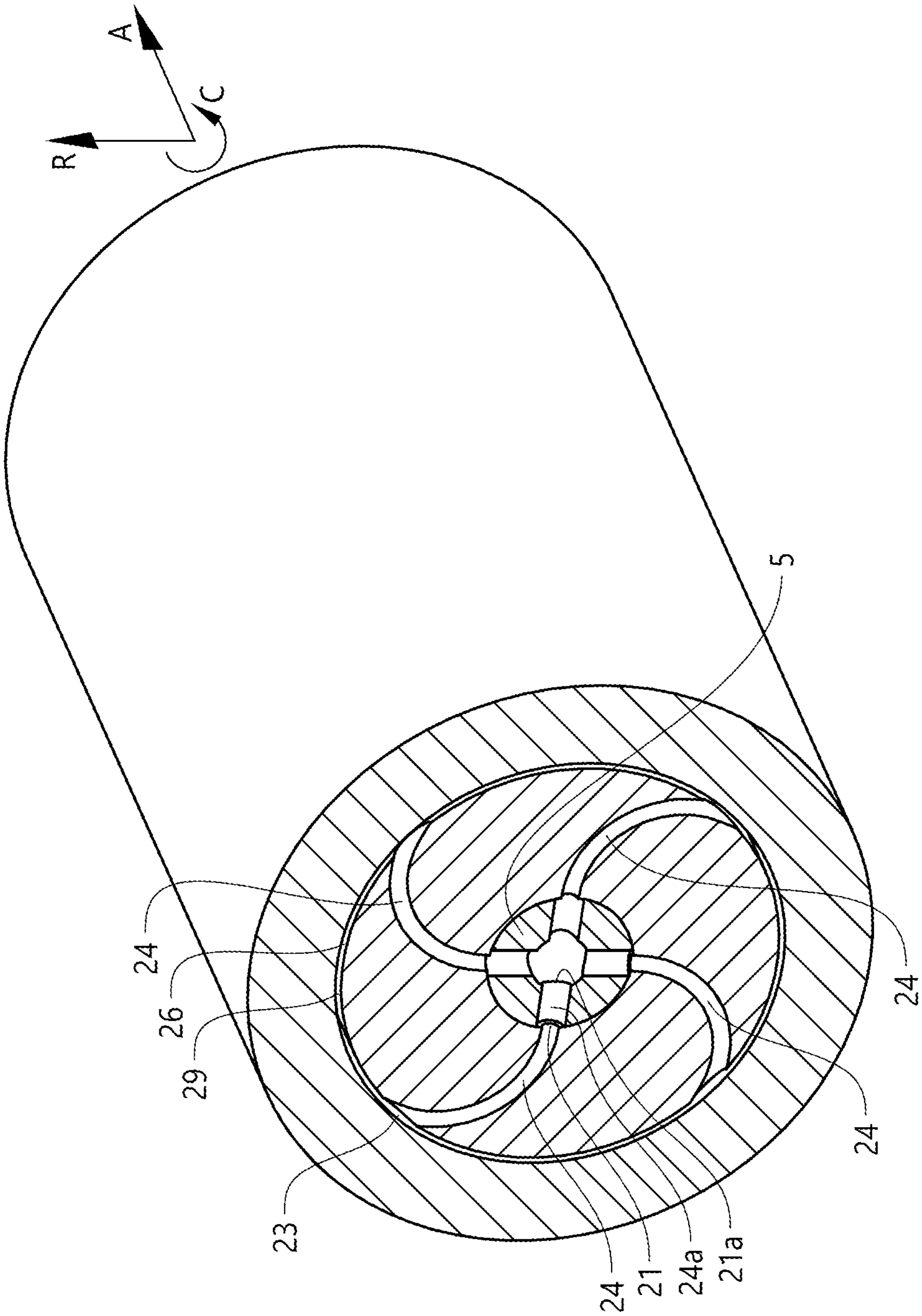

FIG. 2 depicts a general overview of parts of the electric machine in FIG. 1 according to an example embodiment of the invention, which will be further described in relation to FIGS. 3*a*-3*c*. Other example embodiments will be described in relation to FIGS. 5*a* to 5*c* and FIGS. 6*a* to 6*d*. As illustrated in FIG. 2, the electric machine 10 comprises a fluid-based brake arrangement 2. The fluid-based brake arrangement 2 is generally, although strictly not required, operable by a control unit 90 (as shown in FIG. 1) for reducing the revolution of a rotor 3 relative a stator 4 of the electric machine 10 during a desired braking of the electric machine 10. As will be further described in relation to FIGS. 3*a* to 3*c*, the fluid-based brake arrangement 2 comprises a fluid circuit 20 extending at least through a radial part across the rotor 3, thereby defining a fluid channel arrangement 22 with a radial fluid channel segment 24. The fluid circuit 20 contains a brake fluid 30 (see FIG. 3*a*) to function as working fluid. In order to reduce the temperature of the brake fluid, it may generally be effective to allow the brake fluid to flow through a cooling circuit. As such, the fluid circuit 20 here comprises a cooling circuit 70 for the brake fluid, which is illustrated in FIG. 2. The cooling circuit 70 is here arranged in fluid communication with the fluid channel arrangement 22. Further, the cooling circuit is generally arranged downstream of the radial fluid channel segment 24. In this manner, the cooling circuit 70 allows for dissipating the thermal energy of the brake fluid generated in the rotor during braking of the rotor of the electric machine. By way of example, the cooling circuit comprises a heat exchanger, as is commonly known in the art.

Moreover, as illustrated in FIG. 2, the fluid circuit 20 here includes a reservoir 60 for the brake fluid. The reservoir is here also arranged in fluid communication with the fluid channel arrangement 22. Also, as illustrated in FIG. 2, the reservoir 60 is generally arranged downstream of the cooling circuit 70.

In order to regulate the flow of brake fluid in the fluid circuit 20, there is here arranged a valve 80 in the fluid circuit 20, as depicted in FIG. 2. By way of example, the valve 80 may be a conventional control valve for controlling a fluid. The valve 80 is typically disposed in the fluid channel arrangement 22 and further arranged in communication with the control unit 90. The arrows in FIG. 2 indicate a flow direction of the brake fluid in a braking operation mode where the valve 80 is opened so as to control the flow of the brake fluid in the fluid circuit 20.

The control unit 90 may include a processing circuitry (not shown) and various sensors and activators (not shown) for controlling various components of the electric machine and the fluid braking arrangement 20. By way of example, the control unit 90 is configured to control the valve 80 and the cooling circuit 70 as well as any other components for activating and controlling braking of the electric machine 10.

The control unit 90 is typically configured to control the flow of brake fluid in the fluid channel arrangement 22 in response to a requested brake power. It may be noted that during normal driving of the vehicle, there is generally no flow of brake fluid in the radial fluid channel segment(s) 24 through the rotor of the electric machine 10.

The control unit 90 may for example be an electronic control unit (ECU), comprised with the vehicle 1, possibly manifested as a general-purpose processor, an application specific processor, a circuit containing processing components, a group of distributed processing components, a group of distributed computers configured for processing, a field programmable gate array (FPGA), etc. The control unit 90 may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Examples of control signals that may be communicated to the control unit 90 are current torque of the electric machine 10, current revolution of the rotor 3 of the electric machine, signals on a request of braking of the vehicle, e.g. from a braking pedal of the vehicle, data on the temperature of the brake fluid and the electric machine, current setting of the valve 80 etc. It should be readily appreciated that the complete control function of the control unit is generally defined in view of the type of vehicle and type of electric machine, and may thus vary for different types of vehicles etc.

The electric machine may generally also include additional conventional parts of the electric machine such as permanent magnets, windings etc., which are common parts of an electric machine and thus not further described herein.

Turning now to FIGS. 3*a* to 3*c*, there is depicted additional parts of the electric machine 10 and the fluid-based brake arrangement 2. That is, FIGS. 3*a*-3*c* schematically illustrate an example embodiment of a fluid-based brake arrangement for a rotor of the electric machine in FIG. 2. The electric machine generally extends in a radial direction R, an axial direction A and in a circumferential direction C. The radial direction is generally perpendicular to the axial direction, as depicted in the FIGS. 3*a* to 3*c*.

As mentioned above in relation to FIG. 2, the electric machine 10 comprises the rotor 3 and the stator 4. As may be gleaned from FIG. 3*a*, the electric machine 10 is here an internal rotor arrangement (sometimes also denoted as an internal-rotor electric machine), in which the stator 4 is an outer stator and the rotor 3 is an inner rotor coaxially arranged radial inside the outer stator. It should be noted that the rotor in FIG. 2 and FIGS. 3*a* to 3*c* is only a schematic illustration of a rotor in the form of a solid rotor so as to ease the explanation of the example embodiments. By way of example, if the rotor would be a rotor comprising permanent magnets, the rotor may generally also include embedded permanent magnets (not shown), as is commonly known in the field of electric machines. However, it should be noted that the rotor may likewise be an induction motor, in which the magnetic field of rotor is induced. Hence, the type of rotor may be different for different types of electric machines.

The rotor 3 is generally arranged around the rotational axis. In the example embodiment in FIGS. 3*a* to 3*c*, the rotor 3 is a substantially cylindrical body. If the rotor is a permanent magnet rotor, one or more embedded permanent magnet may be fitted at least on the edge of each magnetic pole N, S, as generally known in the art. That is, the permanent magnets are embedded on a shell surface of the rotor corresponding to an outer radial rotor side 32.

Turning now to the fluid-based brake arrangement 2 for the rotor 3, as depicted e.g. in FIG. 3*a*, the fluid-based brake arrangement 2 comprises the fluid circuit 20, which in operation contains the brake fluid 30, for enabling braking of the rotor 3 relative the stator 4. The fluid circuit 20 is adapted for transporting the brake fluid 30, e.g. by defining a closed loop fluid passageway for the brake fluid. As will be further described below, in order to provide a braking effect of the rotor 3, the fluid circuit 20 comprises the fluid channel arrangement 22 having at least one radial fluid channel segment 24 for transporting the brake fluid radially though the rotor 3 during a desired braking of the rotor 3 relative the stator 4.

The radial fluid channel segment 24 extends radially through the rotor 3 so as to allow for directing the brake fluid 30 from an inner radial rotor side 34 to the outer radial rotor side 32, see FIG. 3*b* for suitable reference numerals. The radial fluid channel segment 24 has a main extension in a radial "fluid flow" direction, and an extension in the axial direction being perpendicular to the main extension.

In the example embodiment described in relation to FIGS. 3*a* to 3*c*, the fluid channel arrangement 22 has four radial fluid channel segments 24 distributed about the radial direction of the rotor 3. In addition, the fluid channel arrangement 22 here comprises four axial sets of these four radial fluid channel segments 24 distributed along the axial direction A of the rotor 3, which is also schematically illustrated in e.g. FIG. 3*a*. In other words, it may be conceivable that the radial fluid channel segment comprises a plurality of radial channel portions. It should be noted that the radial fluid channel segments may be distributed in other ways along the radial and axial extensions of the rotor depending on type of rotor and type electric machine.

Accordingly, each one of the radial fluid channel segments 24 of the above arrangement extends radially through a part of the rotor 3 so as to allow for directing the brake fluid 30 from the inner radial rotor side 34 to the outer radial rotor side 32.

As illustrated in FIGS. 3*a* to 3*c*, each one of the radial fluid channel segments 24 extends completely through the rotor 3 in the radial direction R. That is, each one of the radial fluid channel segments 24 is radially arranged at least through a cross-sectional part of the rotor 3, which is further depicted in e.g. FIG. 3*c*. As shown in e.g. FIG. 3*a*, each one of the radial fluid channel segments 24 is arranged through a part of the rotor 3 at a location where the extension of the radial fluid channel segment 24 in the axial direction A is delimited by the rotor body material. As such, the radial fluid channel segment is here a tubular channel segment.

By means of the radial fluid channel segment, the brake fluid 30 is allowed to be transported from the inner side 34 of the rotor 3 to the outer side 32 of the rotor 3 during rotation of the rotor about its axial centre axis, which in FIGS. 3*a* to 3*c* corresponds to the axial centre $A_C$.

Moreover, the fluid channel arrangement 22 generally includes an entrance 28 for the brake fluid at the axial centre $A_C$ of the rotor 3. The entrance is here in fluid connection with each one of the radial fluid channel segments 24. Also, the rotor 3 here comprises an inner hollow rotor shaft 5. The inner hollow rotor shaft 5 defines an axial fluid passage 25 for the brake fluid. As illustrated in e.g. FIG. 3*a*, the axial fluid passage 25 is in fluid communication with the each one of the radial fluid channel segments 24. It should be noted that the inner hollow rotor shaft 5 is typically an integral part of the rotor 3. Hence, the inner hollow rotor shaft 5 may have a corresponding radial fluid channel segment 24*a*, as is illustrated in e.g. FIG. 3*c*. However, it is also possible with other types of rotor arrangements and the radial fluid channel segments 24 may sometimes be in direct fluid communication with the axial fluid passage across the rotor 3.

Referring again to the example embodiment described in relation to FIGS. 3*a* to 3*c*, each one of the radial fluid channel segments 24 has a corresponding inlet 21 for the brake fluid 30. Each one of the inlets 21 of the radial fluid channel segments 24 is in fluid communication with the fluid circuit 2. By way of example, and as depicted in e.g. FIG. 3*a*, each one of the inlets 21 of the radial fluid channel segments 24 is aligned with entrance 28 of the fluid channel arrangement 22. In other words, each one of the inlets 21 of the radial fluid channel segments 24 is essentially arranged at the axial centre $A_C$ of the rotor 3.

In rotor configurations with a hollow rotor shaft having corresponding radial fluid channel segments 24*a*, as illustrated in FIGS. 3*a* to 3*c*, each one of the corresponding radial fluid channel segments 24*a* may have a corresponding inlet 21*a*, which are then in fluid communication with the axial fluid passage 25 and the entrance 28.

To this end, the entrance for the brake fluid is here in fluid connection with each one of the radial fluid channel segments 24 for transporting the brake fluid through the rotor 3.

Analogously, each one of the radial fluid channel segments 24 comprises a corresponding outlet 23 for the brake fluid. Typically, each one of the outlets 23 are arranged radial outside its corresponding inlet 21. The radial fluid channel segments 24 may further be aligned into a common outlet passage having a common outlet 29. The common outlet passage may be defined in several different manners depending on type of electric machine. If the rotor is part of a permanent magnet electric machine, the common outlet passage may typically be defined in between the embedded permanent magnets on the outer surface of the rotor (although not shown), generally corresponding to the outer radial rotor side 32. In a common design of the electric machine, as also illustrated in FIGS. 3*a* to 3*c*, the rotor 3 and stator 4 are spaced apart relative each other in the radial direction R. As such, the radial distance between the rotor 3 and the stator 4 define a radial space 26, as shown in FIG. 3*c*. Typically, the radial space 26 defines at least parts of the common outlet passage. To this end, the radial fluid channel segment 24 has a radial outlet 23 aligned with the radial space 26, whereby, during rotation of the rotor, the brake fluid is allowed to flow in the radial space 26 (defining parts of the common outlet passage) to the common outlet 29.

By way of example, the common outlet 29 is arranged proximity to an axial rotor end 44 (FIG. 3*a*) at the outer radial rotor side 32. The common outlet 29 defines a fluid connection with the fluid circuit 20 for transporting the brake fluid further upstream in the fluid circuit.

In order to effect a braking of the rotor 3 relative the stator 4, during rotation of the rotor 3 about its axial centre axis $A_C$, the flow of brake fluid 30 is controlled to be transported in the radial channel segments 24 of the fluid channel arrangement 22 so as to flow from the inner radial rotor side 34 to the outer radial rotor side 32. That is, during rotation of the rotor 3 about its axial centre axis, an acceleration of the flow of brake fluid in each one of the radial fluid channel segments 24 causes a reaction force exerting a braking torque on the rotor 3. In other words, the brake fluid in the radial fluid channel segment 24 is transported in a direction from the inner radial side 34 of the rotor 3 to the outer radial side 32 of the rotor 3 so as to provide the braking torque (see the arrows in FIG. 3*a*).

It should be readily appreciated that the shape of the radial fluid channel segment 24 may vary for different types of rotors. In the example embodiment described in relation to FIGS. 3*a* to 3*c*, each one of the radial fluid channel segments 24 is provided as curved radial fluid channel segments of similar shape. In FIGS. 3*a* to 3*c*, the curved radial fluid channel segments are backward-curved channels, given the direction of rotation C of the rotor.

Figure 4:
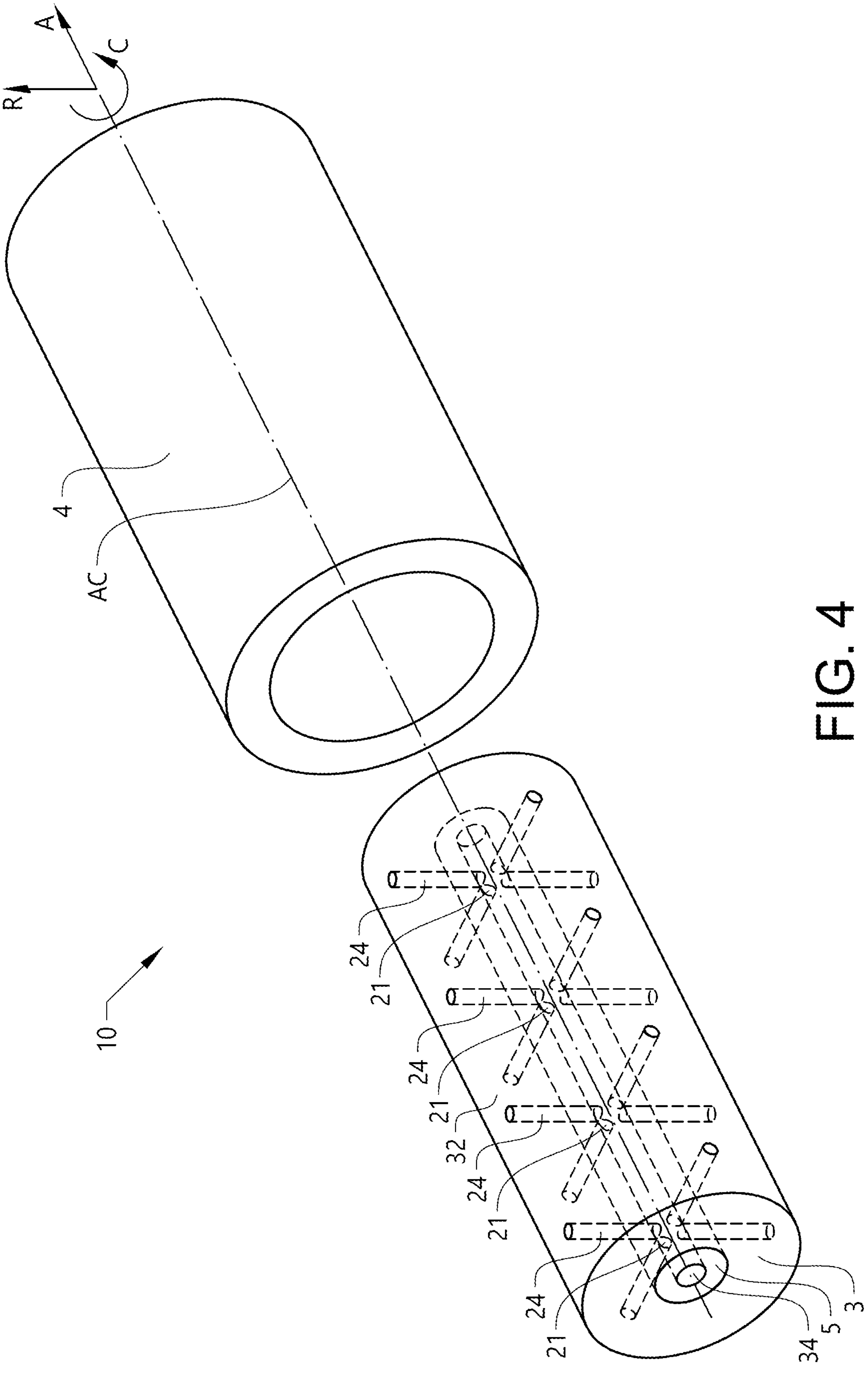
FIG. 4 schematically illustrates another example embodiment of a fluid-based brake arrangement for a rotor of the electric machine in FIG. 2 according to the invention.

Another example of a suitable shape of radial fluid channel segment is illustrated in FIG. 4, in which the radial fluid channel segment is an essentially straight radial fluid channel segment. Besides this difference between the embodiments in FIGS. 3*a* to 3*c* and FIG. 4, the example embodiment in FIG. 4 may incorporate any one of the features, functions and effects as described in relation to the example embodiment illustrated in FIGS. 3*a* to 3*c*. It should also be readily appreciated that the radial channel segments may be provided in different shapes with different extensions across the rotor 3 of the electric machine.

Further, while the example embodiments in FIGS. 3*a* to 3*c*, and FIG. 4, include a number of radial fluid channel segments, it may also be possible to provide the rotor with one single radial fluid channel segment. Also, while the radial fluid channel segment typically continues to the radial space 26, the radial fluid channel segment 24 may likewise directly extend to an outlet at the axial end 44 of the rotor 3.

FIGS. 5*a*-5*c* and FIGS. 6*a* to 6*d* schematically illustrate further example embodiments of a fluid-based brake arrangement for a rotor of the electric machine in FIG. 2. It should be noted that, unless explicitly described herein, the example embodiment in FIGS. 5*a* to 5*c* and the example embodiment in FIGS. 6*a* to 6*d* may incorporate any one of the features, functions and effects as described in relation to the example embodiment illustrated in FIGS. 3*a* to 3*c* and FIG. 4.

Figure 5B:
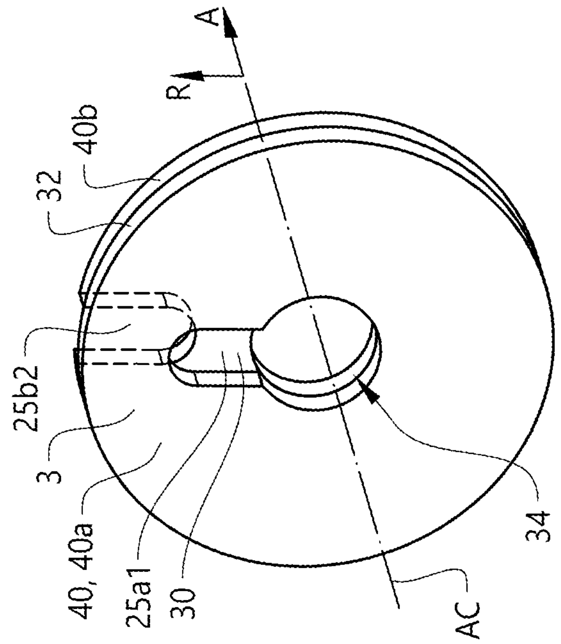
FIGS. 5*a*-5*c* schematically illustrate yet another example embodiment of a fluid-based brake arrangement for a rotor of the electric machine in FIG. 2 according to the invention.
Figure 5A:
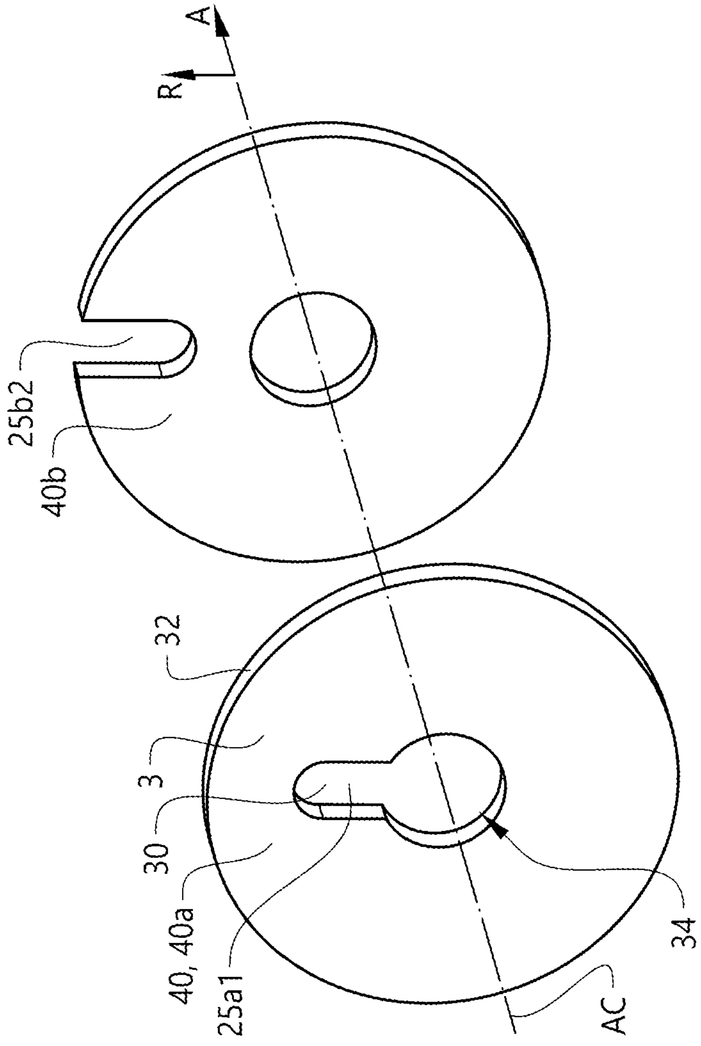
Figure 5C:
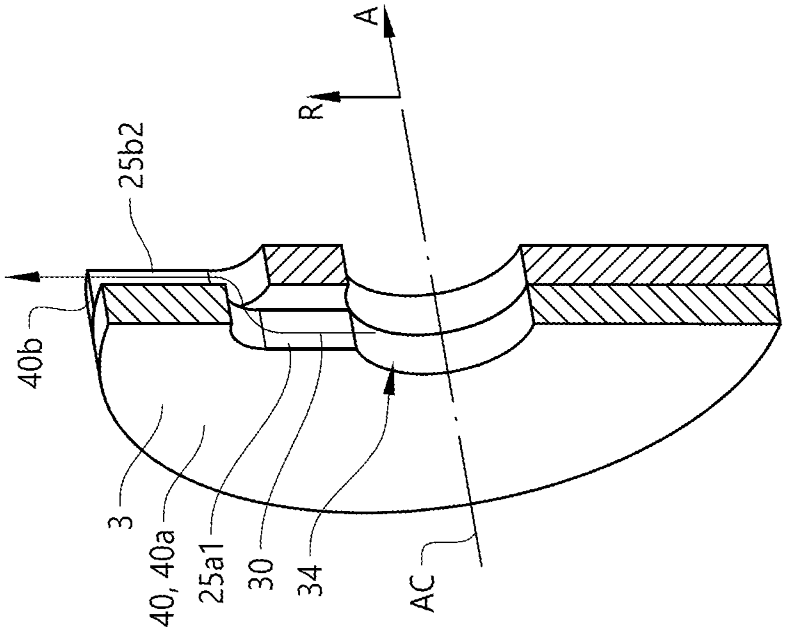

Turning to the example embodiment in FIGS. 5*a* to 5*c*, one difference between the example embodiment in FIGS. 5*a* to 5*c* and the example embodiment in FIGS. 3*a* to 3*c*, relates to the structure of the rotor 3.

In FIG. 5*a*, a part of the rotor 3 is shown. The rotor 3 comprises a lamellar rotor body having a series of radial extending sheets, which is here illustrated in the form of two radial extending sheets 40, 40*a* and 40*b*. The radial extending sheets 40*a* and 40*b* are arranged along the axial direction A. As illustrated in FIGS. 5*a* to 5*c*, the radial extending sheets 40*a* to 40*b* are arranged about the axial centre $A_C$. Each one of the radial extending sheets 40*a* to 40*b* has a substantial extension in the radial direction R. Also, each one of the radial extending sheets 40*a* to 40*b* has an extension in the axial direction A. The radial extending sheets are typically made of a thin material, such as a magnetic metallic material. To this end, the extension in the axial direction A of each one of the radial extending sheets is generally substantial less than the total axial extension of the rotor 3, as may also be appreciated from FIGS. 5*a* to 5*c*.

In the example embodiment in FIGS. 5*a* to 5*c*, the radial fluid channel segment 24 is provided by two axial through holes 25*a*1, 25*b*2 in two consecutive radial extending sheets 40*a* and 40*b*. Each one of the axial through holes 25*a*1, 25*b*2 of the consecutive radial extending sheets 40*a* and 40*b* extends a substantial part in the radial direction R. Each one of the axial through holes 25*a*1, 25*b*2 also has an extension in the axial direction A corresponding to the axial extension of its corresponding radial extending sheet, as illustrated in e.g. FIG. 5*c*. Further, as may be gleaned from FIG. 5*c*, a part of the axial through hole 25*a*1 of the radial extending sheet 40*a* overlaps with a part of the axial through hole 25*b*2 of the radial extending sheet 40*b* in the radial direction R. In this manner, the radial channel segment 24 defined by the axial through holes 25*a*1, 25*b*2 permits the brake fluid 30 to flow from the inner radial rotor side 34 to the outer radial rotor side 32 during rotation of the rotor 3 so as to provide the braking function when applicable.

Figure 6A:
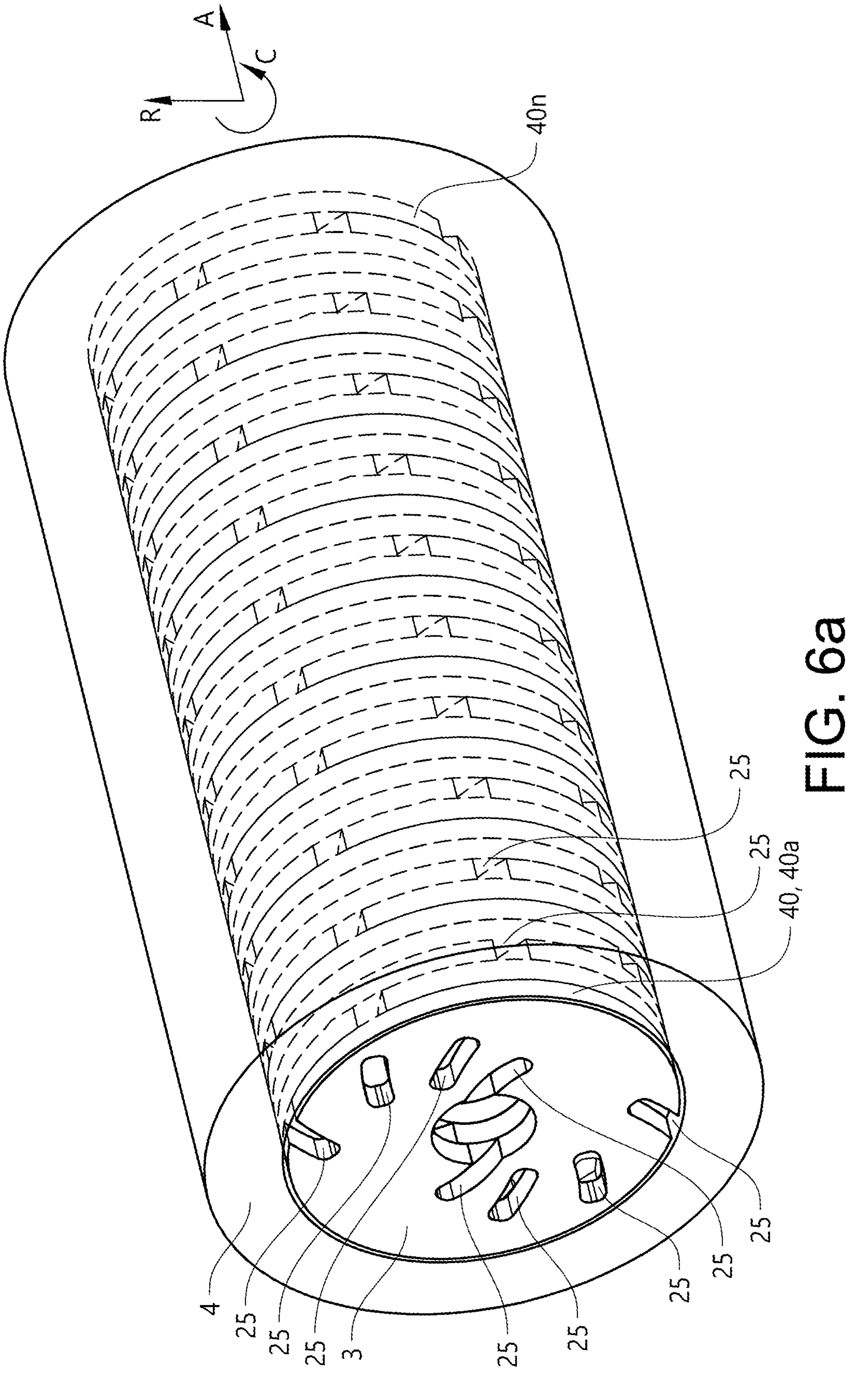
FIGS. 6*a*-6*d* schematically illustrate another example embodiment of a fluid-based brake arrangement for a rotor of the electric machine in FIG. 2 according to the invention.
Figure 6B:
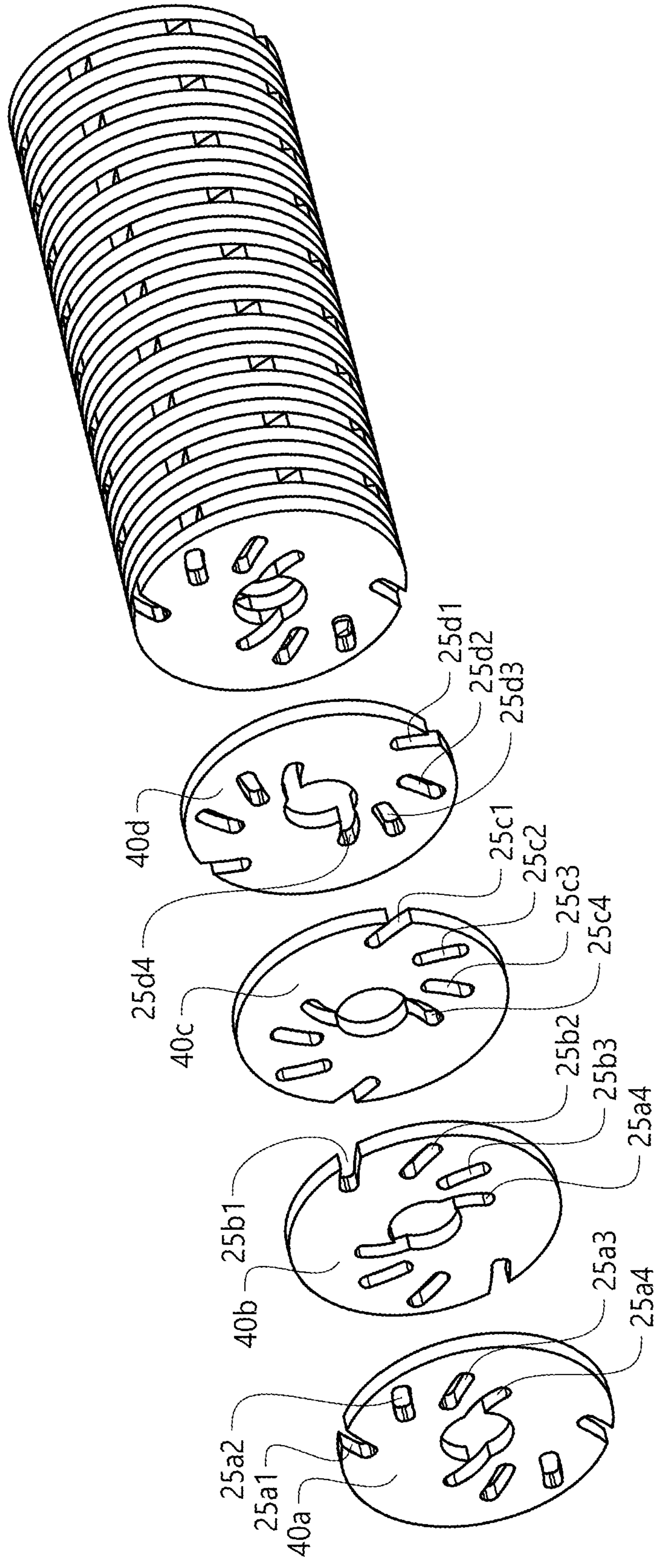
Figure 6C:
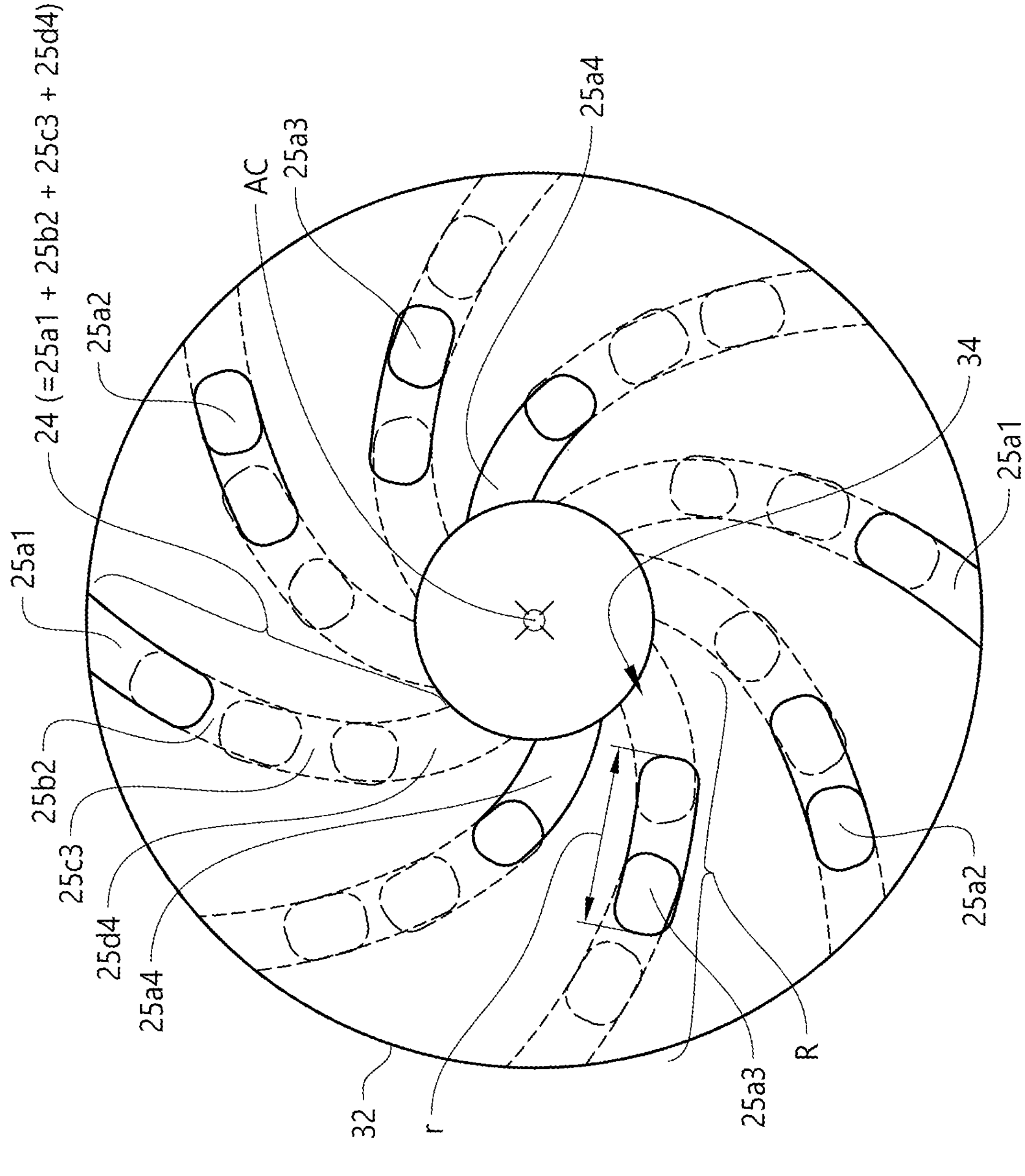

Turning now to the example embodiment in FIGS. 6*a* to 6*d*, there is depicted another example of providing a rotor with a series of radial extending sheets 40 defining the radial fluid channel segment 24 by means of a number of axial through holes. The example embodiment in FIGS. 6*a* to 6*d* illustrates an arrangement having a series of radial extending sheets 40 using one common axial through holes pattern for all the sheets. In this manner, there is provided an arrangement that is balanced along the rotational direction of the rotor 3. As illustrated in e.g. FIG. 6*a*, the rotor 3 comprises a lamellar rotor body having a series of radial extending sheets 40, $\mathbf{40}_a$ to $\mathbf{40}_n$. The radial extending sheets $\mathbf{40}_a$ to $\mathbf{40}_n$ are arranged along the axial direction A. As illustrated in FIGS. 6*a* to 6*c*, the radial extending sheets $\mathbf{40}_a$ to $\mathbf{40}_n$ are arranged about the axial centre $A_C$. Each one of the radial extending sheets $\mathbf{40}_a$ to $\mathbf{40}_n$ has a substantial extension in the radial direction R. Also, each one of the radial extending sheets $\mathbf{40}_a$ to $\mathbf{40}_n$ has an extension in the axial direction A. The radial extending sheets are typically made of a thin material, such as a magnetic metallic material. To this end, the extension in the axial direction A of each one of the radial extending sheets is generally substantial less than the total axial extension of the rotor 3, as is also appreciated from FIGS. 6*a* to 6*d*.

Figure 6D:
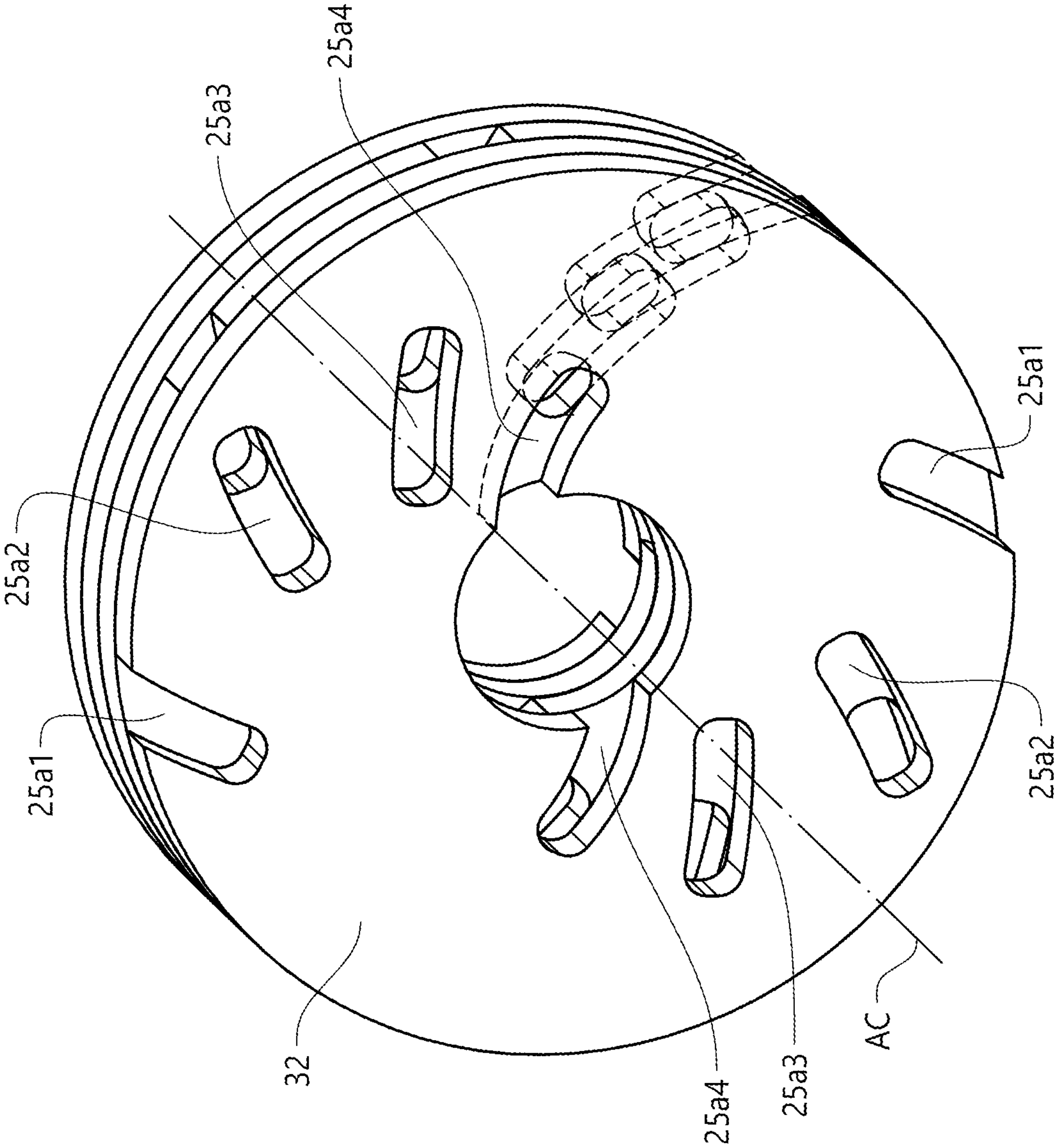

Similar to the example in FIGS. 5*a* to 5*c*, the radial fluid channel segment 24 of the example in FIGS. 6*a* to 6*d* is provided by means of a number of axial through holes 25. That is, each one of the radial extending sheets $\mathbf{40}_a$ to $\mathbf{40}_n$ comprises at least one axial through hole 25 extending a substantial part in the radial direction R. As illustrated in FIG. 6*d*, each one of the axial through holes has a substantial radial extension r in the radial extension R. It may be noted that the each one of the axial through holes also has an extension in the axial direction A corresponding to the axial extension of the corresponding radial extending sheet. In the example embodiment illustrated in FIGS. 6*a* to 6*d*, each one of the radial extending sheets $\mathbf{40}_a$ to $\mathbf{40}_n$ comprises eight axial through holes 25. The axial through holes 25 of one radial extending sheet are here distributed about the axial centre $A_C$ and along the circumferential direction C of the radial extending sheet in a certain pattern, as illustrated in e.g. FIG. 6*a*. The pattern is here substantially the same for each sheet. Also, as illustrated in FIG. 6*a*, the axial through holes 25 of adjacent radial extending sheets are here distributed about the axial centre $A_C$ along the circumferential direction C of the radial extending sheets in a certain pattern, which now will be described in more detail for a number of four radial extending sheets, i.e. the radial extending sheets 40*a* to 40*d*.

Firstly, as is readily appreciated from FIG. 6*b* in combination with FIG. 6*c*, the radial extension r of each one of the axial through holes 25 is shorter than a total radial extension R of the radial fluid channel segment 25. The total radial extension R of the radial fluid channel segment 24 may generally be defined as the radial extension between the inner radial side 34 and the outer radial side 32. This is e.g. illustrated in FIG. 6*c*.

To this end, the extension of the radial fluid channel segment 24 in the radial direction R and in the axial direction A of the rotor 3 is defined by a given number of axial through holes $\mathbf{25}_a$ to $\mathbf{25}_n$ of a given number of radial extending sheets $\mathbf{40}_a$ to $\mathbf{40}_n$. In the example embodiment illustrated in FIGS. 6*a* to 6*d*, the extension of the radial fluid channel segment 24 in the radial direction R and in the axial direction A of the rotor is defined by the four axial through holes 25*a*1, 25*b*2, 25*c*3 and 25*d*4 of the four consecutive radial extending sheets 40*a* to 40*d*. This is also illustrated in FIG. 6*d*.

The axial through holes 25*a*1, 25*b*2, 25*c*3 and 25*d*4 of the consecutive radial extending sheets 40*a* to 40*d* are here arranged with a successive angle increment relative to the axial centre axis $A_C$ so as to define a continuous part of the radial fluid channel segment 24 in the radial direction R and axial direction A. It should be readily appreciated that the angle increment of the axial through holes 25*a*1, 25*b*2, 25*c*3 and 25*d*4 may be distributed in a number of different ways about the axial centre axis $A_C$ so as to define a continuous part of the radial fluid channel segment 24 in the radial direction R and axial direction A, as long as adjacent axial though holes of consecutive sheets define an overlap in the radial direction.

Accordingly, as also illustrated in e.g. FIG. 6*d*, the axial through holes 25*a*1, 25*b*2, 25*c*3 and 25*d*4 of the consecutive radial extending sheets 40*a* to 40*d* define a radial channel segment extending from the inner radial side to the outer radial side so as to permit a flow of brake fluid to flow across the radial direction R of the rotor 3 during rotation thereof.

By way of example, the axial through holes 25 may be distributed about the axial centre axis $A_C$ with 45 degrees angle increment over 180 degrees so as to create two opposing channels per sheet on average. That is, each radial fluid channel segment 24 is part of four sheets and each sheet is part of eight channels. The number of channels per sheet can be increased by reducing angle increment and period, and may also be reduced by letting each angle increment consist of a group of identically oriented sheets, or include more than one sheet type.

Other conceivable arrangements of a given number of axial through holes for a given number of consecutive radial extending sheets are also possible as long as the combined radial extension of the axial through holes define a complete radial channel segment from the inner radial side to the outer radial side.

The fluid circuit and braking of the rotor operates as follows. A brake fluid such as oil is transported into the centre of the hollow rotor shaft 5 and through the radial fluid channel segments 24, that may be defined by the axial through holes 25, and subsequently to the radial space 26 between the rotor 3 and stator 4. From there, it may leave the internals of the electric machine to pass the cooling circuit and the reservoir before being recirculated into the rotor 3, as also illustrated in FIG. 2.

It may also be noted that the radial fluid channel segments can be produced in several different ways, such as drilled channels. With a laminated rotor body, as illustrated in FIGS. 5*a* to 5*c*, and also in FIGS. 6*a* to 6*d*, the axial through holes can be created by hole patterns in the discs. Each disc can remain a closed loop around the shaft (which may also improve the structural integrity of the rotor at high rotational speeds), thereby having the resulting complete channel extending axially through more than one disc.

The hole pattern of the axial through holes 25 can be provided such that all sheets are identical, but assembled with a successive angle increment as depicted above.

Figure 7:
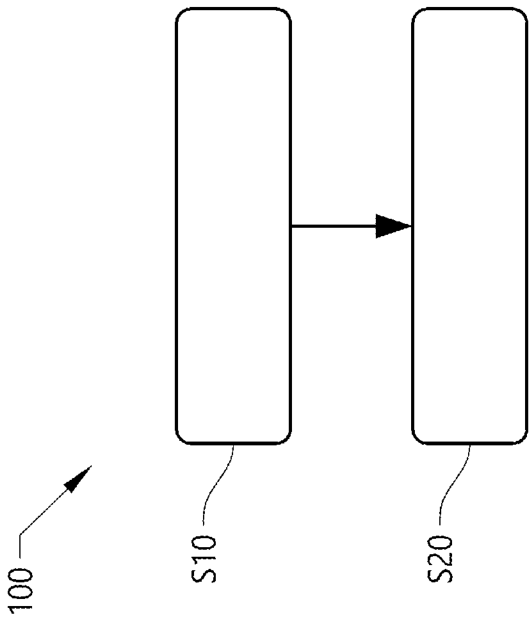
FIG. 7 schematically illustrates a flow-chart of a method for controlling braking of the electric machine according to the invention.

FIG. 7 shows a flow chart for an example embodiment of a method according to the invention. The exemplified method may start out from a situation where the electric machine 10 operates in a normal operational mode where the rotor of the electric machine rotates relative the stator in order to provide a propulsive torque to the vehicle.

The exemplified method comprises the following steps:

S10—receiving a request for braking a rotor of an electric machine in response to a requested brake power;

S20—controlling the flow of brake fluid in the fluid circuit so as to permit transportation of brake fluid through at least one radial fluid channel segment of the rotor; whereby acceleration of the brake fluid in the radial direction in the at least one radial fluid channel segment causes a reaction force exerting a braking torque on the rotor.

The steps of the method are generally performed by the control unit 90, as described above in relation to FIG. 2. Hence, it should be noted that the embodiments of the method may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Also, although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage.

The invention claimed is:

1. An electric machine comprising a rotor, a stator, and a fluid-based brake arrangement for said rotor, said fluid-based brake arrangement having a fluid circuit for transporting a brake fluid, said fluid circuit comprising a fluid channel arrangement having at least one radial fluid channel segment extending radially through a part of said rotor so as to allow for directing brake fluid from an inner radial rotor side to an outer radial rotor side, such that, during rotation of said rotor about an axial center axis, acceleration of brake fluid in said at least one radial fluid channel segment causes a reaction force exerting a braking torque on the rotor.

2. The electric machine according to claim 1, wherein the electric machine is an internal rotor arrangement, in which the stator is an outer stator and the rotor is an inner rotor coaxially arranged inside the outer stator.

3. The electric machine according to claim 2, wherein the rotor and stator being spaced apart relative each other in the radial direction so as to define a radial space therebetween, wherein the at least one radial fluid channel segment has a radial outlet aligned with the radial space, wherein, during rotation of said rotor, said brake fluid is allowed to flow in said radial space.

4. The electric machine according to claim 1, wherein said fluid channel arrangement having an entrance for said brake fluid at an axial center of said rotor, said entrance being in fluid connection with said at least one radial fluid channel segment.

5. The electric machine according to claim 1, wherein said fluid channel arrangement having an outlet arranged proximity to an axial rotor end at the outer radial rotor side, said outlet being in fluid connection with said at least one radial fluid channel segment.

6. The electric machine according to claim 1, wherein the rotor comprises an inner hollow rotor shaft defining an axial fluid passage for the brake fluid, said axial fluid passage being in fluid communication with the at least one radial fluid channel segment.

7. The electric machine according to claim 1, further comprising a cooling circuit for said brake fluid, said cooling circuit being arranged in fluid communication with said fluid circuit.

8. The electric machine according to claim 1, further comprising a reservoir for said brake fluid, said reservoir being arranged in fluid communication with said fluid circuit.

9. The electric machine according to claim 1, wherein the rotor comprises a lamellar rotor body having a series of radial extending sheets arranged along the axial direction, and wherein each one of the radial extending sheets comprises an axial through hole extending a substantial part in the radial direction, such that the extension of the radial fluid channel segment in the radial and axial direction of the rotor is defined by the series of axial through holes of the radial extending sheets.

10. The electric machine according to claim 9, wherein axial through holes of consecutive radial extending sheets are arranged with a successive angle increment relative an axial center axis so as to define a continuous part of the radial fluid channel segment in the radial direction and axial direction.

11. The electric machine according to claim 10, wherein the radial fluid channel segment is a curved radial fluid channel segment.

12. The electric machine according to claim 9, wherein the radial extension of each one of the axial through holes is shorter than a total radial extension of the radial fluid channel segment.

13. The electric machine according to claim 1, further comprising a control unit for controlling the flow of brake fluid in said fluid channel arrangement in response to a requested brake power.

14. The electric machine according to claim 1, wherein the electric machine comprising the brake fluid, said brake fluid being provided in the form of a liquid, such as oil or water.

15. A vehicle comprising an the electric machine according to claim 1.

16. A method for braking a rotor of an electric machine, comprising receiving a request for braking the rotor of the electric machine in response to a requested brake power; and controlling the flow of brake fluid in a fluid-based brake arrangement having a fluid circuit for transporting the brake fluid, so as to permit transportation of brake fluid through at least one radial fluid channel segment extending radially through a part of said rotor; such that acceleration of the brake fluid in the at least one radial fluid channel segment causes a reaction force exerting a braking torque on the rotor.

* * * * *